United States Patent
Vayanos et al.

(10) Patent No.: US 6,813,284 B2
(45) Date of Patent: Nov. 2, 2004

(54) METHOD AND APPARATUS FOR ALLOCATING DATA STREAMS GIVEN TRANSMISSION TIME INTERVAL (TTI) CONSTRAINTS

(75) Inventors: Alkinoos Vayanos, San Diego, CA (US); Francesco Grilli, Irvine, CA (US); Peng Li, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 728 days.

(21) Appl. No.: 09/764,788

(22) Filed: Jan. 17, 2001

(65) Prior Publication Data

US 2002/0122400 A1 Sep. 5, 2002

(51) Int. Cl.[7] .................................................. H04Q 7/24
(52) U.S. Cl. ..................... 370/537; 370/468; 370/470
(58) Field of Search ............................... 370/338, 462, 370/412, 465, 468, 470, 471, 537, 538, 337; 345/2.1

(56) References Cited

U.S. PATENT DOCUMENTS

| | | | | |
|---|---|---|---|---|
| 5,463,620 A | * | 10/1995 | Sriram | 370/468 |
| 5,898,670 A | * | 4/1999 | Hoebeke et al. | 370/468 |
| 5,999,534 A | * | 12/1999 | Kim | 370/412 |
| 6,008,777 A | * | 12/1999 | Yiu | 345/2.1 |
| 6,201,793 B1 | * | 3/2001 | Chen et al. | 370/412 |
| 6,240,079 B1 | * | 5/2001 | Hamalainen et al. | 370/337 |
| 6,246,681 B1 | * | 6/2001 | Humphrey et al. | 370/412 |

FOREIGN PATENT DOCUMENTS

| EP | 1 001 642 A1 | 5/2000 |
|---|---|---|
| EP | 1 009 174 A2 | 6/2000 |

OTHER PUBLICATIONS

3GPP, "Universal Mobile Telecommunications System (UMTS); Radio Interface Protocol Architecture (3GPP TS 25.301 version 3.6.0 Release 1999)," ETSI TS 125 301 V3.6.0 (Sep. 2000), pp. 1–45.

* cited by examiner

Primary Examiner—Salvatore Cangialosi
(74) Attorney, Agent, or Firm—Philip Wadsworth; Sandra L. Godsey; Albert Harnois

(57) ABSTRACT

A method and system that enables multiplexing a plurality of data streams onto one data stream based on data stream priorities, available transport format combinations (TFCs), and transmission time interval (TTI) constraints of transport frames within the TFCs is disclosed. A subscriber unit has applications that produce separate data streams. Example applications include voice, signaling, E-mail and web applications. The data streams are combined by a multiplexer module into one data stream called the transport stream. The transport stream is sent over the reverse link to base station transceivers (BTS). The multiplexer module multiplexes the data streams onto a single stream according to available TFCs, TTI constraints, and data stream priorities.

20 Claims, 6 Drawing Sheets

METHOD AND APPARATUS FOR ALLOCATING DATA STREAMS GIVEN TRANSMISSION TIME INTERVAL (TTI) CONSTRAINTS

BACKGROUND

I. Field

The present invention pertains generally to the field of communications and more specifically to a novel and improved system and method for allocating a plurality of data streams onto a single channel given transmission time interval (TTI) constraints.

II. Background

A remote station is located within a network. The remote station includes applications that produce data streams. The remote station allocates the data streams onto a single data stream. A technique for multiplexing data from data streams onto a single data stream is disclosed in U.S. application Ser. No. 09/612,825, filed Jul. 7, 2000, entitled "METHOD AND APPARATUS FOR PROPORTIONATELY MULTIPLEXING DATA STREAMS ONTO ONE DATA STREAM," which is assigned to the assignee of the present invention and incorporated by reference herein.

Choosing an allocation scheme for allocating bits from multiple data streams onto a single channel is difficult because a number of factors have to be taken into consideration. One factor that has to be considered is the priority of each data stream. Higher priority data streams take precedence over lower priority data streams. Another factor that has to be considered is the transport format combinations (TFCs) that are allowed to be transmitted over a channel. A TFC is a combination of transport formats (TFs), each transport format corresponding to a transport channel. A transport format has a number of blocks (i.e. one or more blocks) of data and a block size (BS). The TFC is sent out on a wireless link of the remote station. Yet another factor that has to be considered is transmission time interval (TTI) constraints. Each transport format has a transmission time interval and cannot change during its transmission time interval. An allocation scheme that takes into consideration the priority of data streams, the TFCs available, and the TTIs of the TFs in the TFCs is desired.

SUMMARY

The presently disclosed method and apparatus are directed to allocating a plurality of data streams onto one data stream for transmission. A list of allowable TFCs is received from a network. Bits from data streams at a logical level are placed into TFCs at a transport level based on the priority of the data streams and the TFCs available.

In one aspect, a plurality of applications provides a plurality of data streams to be allocated to a single stream. In another aspect, subscriber units provide a plurality of data streams to be allocated to a single stream of a base station. In still another embodiment, a plurality of base stations provide a plurality of data streams to be multiplexed by a multiplexer within a base station controller.

In one aspect, a subscriber unit comprises a memory, a plurality of applications residing in the memory, each application producing a data stream wherein each data stream comprises at least one block, and a multiplexer configured to receive each data stream and allocate bits from the plurality of data streams onto a single data stream.

In another aspect, a multiplexer is configured to receive each of a plurality of data streams and distribute bits from the plurality of data streams onto a single data stream based primarily on TFCs that meet TTI constraints and secondarily on the priority of the data streams.

In yet another aspect, a wireless communication system comprises a subscriber unit, a base station coupled to the subscriber unit, and a base station controller coupled to the base station. The subscriber unit includes a plurality of applications and a multiplexer, wherein each application produces a data stream as input to the multiplexer and each data stream comprises at least one bit. The multiplexer distributes bits from the data streams onto a single stream based on TFCs that meet TTI constraints.

DETAILED DESCRIPTION OF PREFERRED EMBODIMENTS

Figure 1:
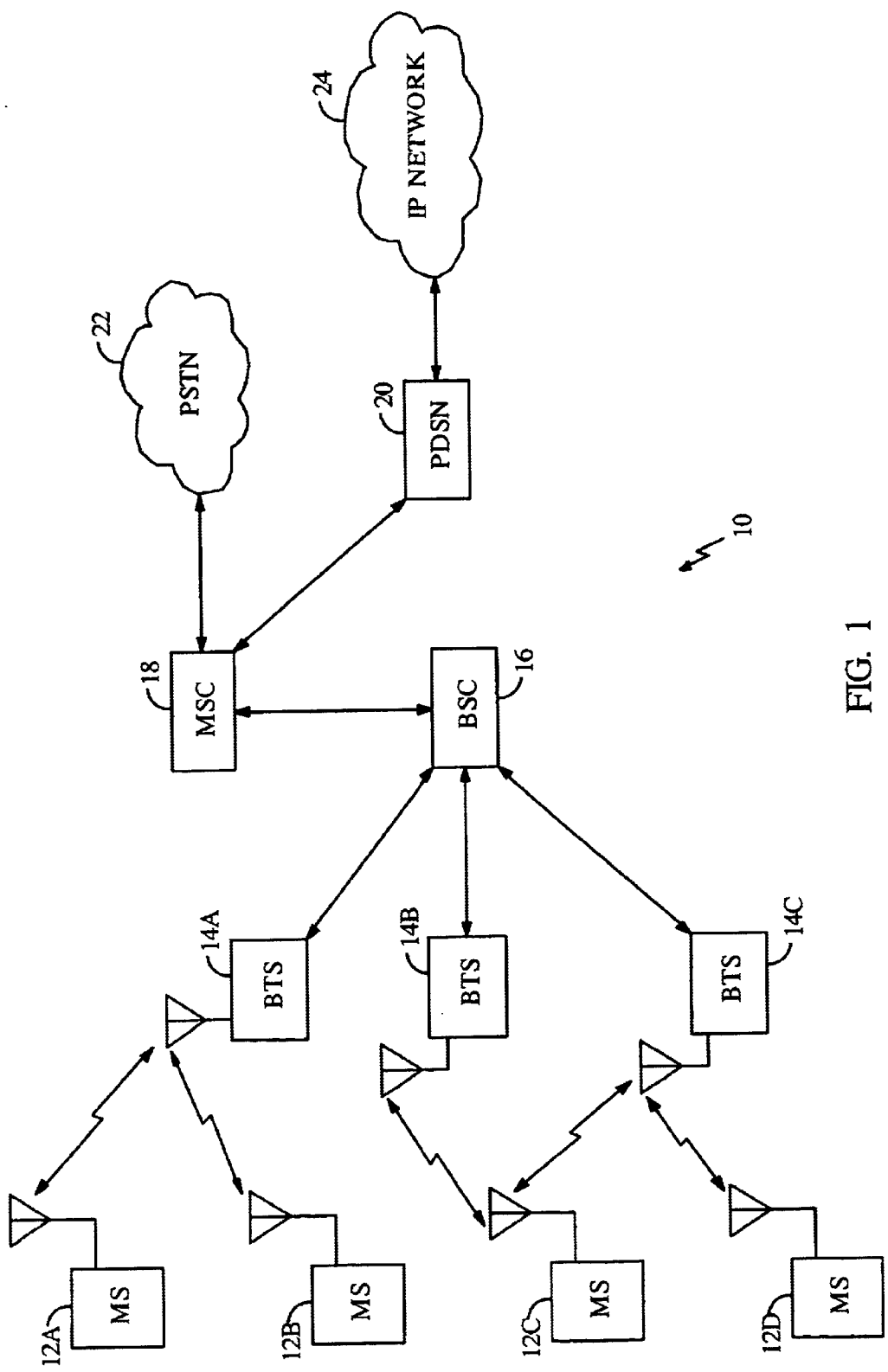
FIG. 1 is a schematic overview of an exemplary cellular telephone system.

An exemplary cellular mobile telephone system in which the present invention is embodied is illustrated in FIG. 1. For purposes of example the exemplary embodiment is described herein within the context of a W-CDMA cellular communications system. However, it should be understood that the invention is applicable to other types of communication systems, such as personal communication systems (PCS), wireless local loop, private branch exchange (PBX), or other known systems. Furthermore, systems utilizing other well known multiple access schemes such as TDMA and FDMA as well as other spread spectrum systems may employ the presently disclosed method and apparatus.

As illustrated in FIG. 1, a wireless communication network 10 generally includes a plurality of subscriber units (also called mobile stations, mobiles, subscriber units, remote station, or user equipment) 12a–12d, a plurality of base stations (also called base station transceiver systems (BTSs) or Node B), 14a–14c, a base station controller (BSC) (also called radio network controller or packet control function 16), a mobile station controller (MSC) or switch 18, a packet data serving node (PDSN) or internetworking function (IWF) 20, a public switched telephone network (PSTN) 22 (typically a telephone company), and an Internet Protocol (IP) network 24 (typically the Internet). For purposes of simplicity, four subscriber units 12a–12d, three base stations 14a–14c, one BSC 16, one MSC 18, and one PDSN 20 are shown. It would be understood by those skilled in the art that there could be any number of subscriber units 12, base stations 14, BSCs 16, MSCs 18, and PDSNs 20.

In one embodiment, the wireless communication network 10 is a packet data services network. The subscriber units 12a–12d may be any of a number of different types of wireless communication devices such as a portable phone, a cellular telephone that is connected to a laptop computer running IP-based, Web-browser applications, a cellular telephone with an associated hands-free car kit, a personal digital assistant (PDA) running IP-based, Web-browser applications, a wireless communication module incorporated into a portable computer, or a fixed location communication module such as might be found in a wireless local loop or meter reading system. In the most general embodiment, subscriber units may be any type of communication unit.

The subscriber units 12a–12d may advantageously be configured to perform one or more wireless packet data protocols such as described in, for example, the EIA/TIA/IS-707 standard. In a particular embodiment, the subscriber units 12a–12d generate IP packets destined for the IP network 24 and encapsulate the IP packets into frames using a point-to-point protocol (PPP).

In one embodiment the IP network 24 is coupled to the PDSN 20, the PDSN 20 is coupled to the MSC 18, the MSC 18 is coupled to the BSC 16 and the PSTN 22, and the BSC 16 is coupled to the base stations 14a–14c via wirelines configured for transmission of voice and/or data packets in accordance with any of several known protocols including, e.g., E1, T1, Asynchronous Transfer Mode (ATM), IP, PPP, Frame Relay, HDSL, ADSL, or xDSL. In an alternate embodiment, the BSC 16 is coupled directly to the PDSN 20, and the MSC 18 is not coupled to the PDSN 20. In one embodiment, the subscriber units 12a–12d communicate with the base stations 14a–14c over an RF interface defined in the $3^{rd}$ Generation Partnership Project 2 "3GPP2," "Physical Layer Standard for cdma2000 Spread Spectrum Systems," 3GPP2 Document No. C.P0002-A, TIA PN-4694, to be published as TIA/EIA/IS-2000-2-A, (Draft, edit version 30) (Nov. 19, 1999) (hereinafter "cdma 2000"), which is fully incorporated herein by reference.

During typical operation of the wireless communication network 10, the base stations 14a–14c receive and demodulate sets of reverse-link signals from various subscriber units 12a–12d engaged in telephone calls, Web browsing, or other data communications. Each reverse-link signal received by a given base station 14a–14c is processed within that base station 14a–14c. Each base station 14a–14c may communicate with a plurality of subscriber units 12a–12d by modulating and transmitting sets of forward-link signals to the subscriber units 12a–12d. For example, as shown in FIG. 1, the base station 14a communicates with first and second subscriber units 12a, 12b simultaneously, and the base station 14c communicates with third and fourth subscriber units 12c, 12d simultaneously. The resulting packets are forwarded to the BSC 16, which provides call resource allocation and mobility management functionality including the orchestration of soft handoffs of a call for a particular subscriber unit 12a–12d from an originating base station 14a–14c to destination base station 14a–14c. For example, a subscriber unit 12c is communicating with two base stations 14b, 14c simultaneously. Eventually, when the subscriber unit 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

The wireless communication channel through which information signals travel from a subscriber unit 12 to a base station 14 is known as a reverse link. The wireless communication channel through which information signals travel from a base station 14 to a subscriber unit 12 is known as a forward link.

CDMA systems are typically designed to conform to one or more standards. Such standards include the "TIA/EIA/IS-95-B Mobile Station-Base Station Compatibility Standard for Dual-Mode Wideband Spread Spectrum Cellular System" (the IS-95 standard), the "TIA/EIA/IS-98 Recommended Minimum Standard for Dual-Mode Wideband Spread Spectrum Cellular Mobile Station" (the IS-98 standard), the standard offered by a consortium named "3rd Generation Partnership Project" (3GPP) and embodied in a set of documents including Document Nos. 3G TS 25.211, 3G TS 25.212, 3G TS 25.213, 3G TS 25.311 and 3G TS 25.214 (the W-CDMA standard), the "TR-45.5 Physical Layer Standard for cdma2000 Spread Spectrum Systems" (the cdma2000 standard), and the "TIA/EIA/IS-856 cdma2000 High Rate Packet Data Air Interface Specification" (the HDR standard). New CDMA standards are continually proposed and adopted for use. These CDMA standards are incorporated herein by reference.

More information concerning a code division multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELPHONE SYSTEM," both of which are assigned to the assignee of the present invention, and are incorporated in their entirety by reference herein.

cdma2000 is compatible with IS-95 systems in many ways. For example, in both the cdma2000 and IS-95 systems, each base station time-synchronizes its operation with other base stations in the system. Typically, the base stations synchronize operation to a universal time reference such as Global Positioning System (GPS) signaling; however, other mechanisms can be used. Based upon the synchronizing time reference, each base station in a given geographical area is assigned a sequence offset of a common pseudo noise (PN) pilot sequence. For example, according to IS-95, a PN sequence having $2^{15}$ chips and repeating every 26.67 milliseconds (ms) is transmitted as a pilot signal by each base station. The pilot PN sequence is transmitted by each base station at one of 512 possible PN sequence offsets. Each base station transmits the pilot signal continually, which enables subscriber units to identify the base station's transmissions as well as for other functions.

In one embodiment, a subscriber unit communicates with a base station using wideband code division multiple access (W-CDMA) techniques. The base stations in a W-CDMA system operate asynchronously. That is, the W-CDMA base stations do not all share a common time reference. Thus, although a W-CDMA base station has a pilot signal, a W-CDMA base station may not be identified by its pilot signal offset alone. Once the system time of one base station is determined, it cannot be used to estimate the system time of a neighboring base station. For this reason, a subscriber unit in a W-CDMA system uses a three-step PERCH acquisition procedure to synchronize with each base station in the system.

In an exemplary embodiment, a subscriber unit has a plurality of applications. The applications reside within the subscriber unit and each application produces a separate data stream. An application may produce more than one data stream.

Figure 2:
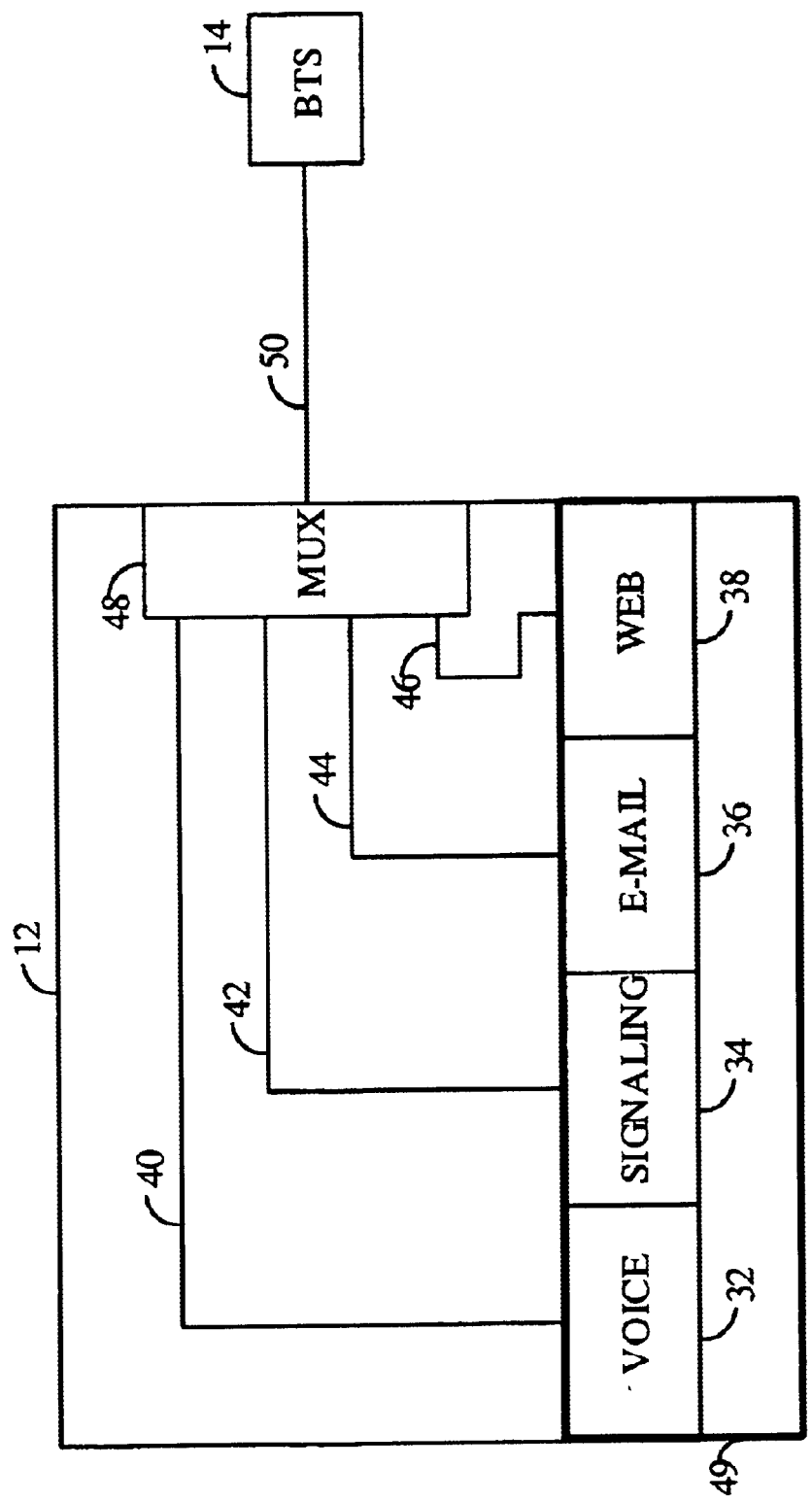
FIG. 2 shows a block diagram of a subscriber unit and a base station in accordance with one embodiment.

FIG. 2 shows a block diagram of a subscriber unit 12 and a base station (BTS) 14 in accordance with an exemplary embodiment. The subscriber unit 12 includes voice 32, signaling 34, E-mail 36 and web applications 38 residing in the memory 49 of the subscriber unit 12. Each application, voice 32, signalling 34, E-mail 36 and web application 38 produces a separate data stream 40, 42, 44, 46, respectively. The data streams are multiplexed by a multiplexer module 48 into one data stream called the transport stream 50. The transport stream 50 is sent over the reverse link to a base transceiver station (BTS) 14, also called a base station for short.

Each data stream 40–46 has a priority. The multiplexer module 48 places bits from data streams at a logical level into TFCs at the transport level based on the priority of the data streams and the TFCs available.

In one embodiment, the multiplexer module 48 operates within the media-access control (MAC) layer and gets the data stream priorities from a higher network layer. The MAC layer defines the procedures used to receive and transmit over the physical layer.

As would be apparent to one of ordinary skill in the art, the data streams 40–46 can be prioritized with any priority scheme known in the art, such as first-in-first-out (FIFO), last-in-first-out (LIFO), and shortest-job-first (SJF). A priority scheme can also be based on the type of data. As would be apparent to one of ordinary skill in the art, the multiplexer module 48 can operate on a plurality of network levels.

In another embodiment, the multiplexer module 48 is executed in hardware. In yet another embodiment, the multiplexer module 48 is executed in a combination of software and hardware. As would be apparent to one of ordinary skill in the art, the multiplexer module 48 can be executed by any combination of software and hardware.

In one embodiment, the multiplexer module 48 employs an allocation algorithm to select the optimum TFC to be transported over a physical channel. In another embodiment, the multiplexer module 48 employs an allocation algorithm to multiplex transport channels into a single coded composite transport channel (CCTrCH) at layer one by selecting the optimum TFC to be transported over the CCTrCH.

From one perspective, a hierarchy of channels maps a plurality of logical channels to a transport channel and maps a plurality of transport channels to a layer one channel. From another perspective, a layer one channel maps to a plurality of transport channels and a transport channel maps to a plurality of logical channels. In one embodiment, the mapping of logical channels to a transport channel and the mapping of transport channels to a layer one channel are received from the network. In addition, for each TF, the network indicates which logical channels mapped onto a transport channel are allowed to use the TF.

Each transport channel has a Transport Format Set (TFS) that is applicable to the transport channel. A TFS is a set of transport formats (TFs) that are applicable to the transport channel. A TF is applicable to the transport channel if bits from data streams at a logical level can be placed into the TF of the transport channel at a given time slot. A TF can comprise null data.

The TF is used for the delivery of blocks of data during a TTI on a transport channel. In one embodiment, the TF comprises dynamic parameters that can change every TTI. In another embodiment, the TF comprises semi-static parameters that cannot change every TTI without channel reconfiguration. In one embodiment, TF parameters include a size of the blocks (Block Size—BS) into which data is divided and a number of such blocks (Block Set Size—BSS) sent in a TTI. In one embodiment, block size and block set size are dynamic. In another embodiment, block size and block set size are semi-static. In one embodiment, TTI size, a parameter indicating an error protection scheme used to check the data, and a CRC length are semi-static parameters. In another embodiment, the TTI size, the parameter indicating an error protection scheme used to check the data, and the CRC length are dynamic parameters.

Each transport channel has a TTI and each TF for the transport channel has the same TTI. Thus, the TTI of a TF corresponds to the TTI of the corresponding transport channel. The TTI length parameter is the TTI of the TF. Each TF has a TTI and cannot change during its TTI.

A TF for each transport channel is combined in a TFC. A TFC is a combination of TFs, each TF corresponding to a transport channel. Thus, if each TF is non-null, data for each transport channel is sent over the wireless link in the form of a TFC. A TFC is sent out on a wireless link of the remote station at each time slot.

Not all possible combinations of TFs are allowed. A set of allowable TFCs is received from the network. The set of allowable TFCs is called the Transport Format Combinations Set (TFCS). The TFCs in the TFCS are allowable in the sense that the network allows the TFCs to be transported through the network. Thus, not all possible combinations of TFs may be submitted to a channel at layer one, but only a subset of all possible combinations, i.e., the TFCS.

In accordance with one embodiment, an optimum TFC is selected to be transmitted over a layer one channel for each time slot. In one embodiment, the TFC selection process occurs at every 10 ms. It would be apparent to those skilled in the art that any time slot size may be used. The ideal time slot size to use would depend on the application. In one embodiment, the TTI for a transport channel can be 10, 20, 40 and 80 ms. It would be apparent to those skilled in the art that any TTI may be used. The TTI of the TFs would depend on the application.

From one time slot to the next time slot, a TF that is not on its TTI boundary does not change in a given TFC. Within a TFC, only those TFs that are on their TTI boundary may change from one time slot to the next time slot. Once a TF has been selected for a given transport channel, it cannot change until the next TTI boundary for that transport channel. Between a TF's TTI boundaries, it is only possible to select TFCs that have the same TF for the transport channel that was in the TFC in the prior time slot. TTIs are aligned for all transport channels. Therefore, a TTI boundary for one transport channel is also a boundary for all transport channels that have an equal or shorter TTI. For example, a 40 ms TTI boundary is also a 20 ms and 10 ms TTI boundary, but is not an 80 ms TTI boundary.

In one embodiment, the allocation algorithm comprises the four steps shown below:
(1) Eliminate TFCs based on the current maximum transmitter power;
(2) Eliminate TFCs from the set based on TTI constraints;
(3) Eliminate TFCs from the set based on available blocks in a transport channel; and
(4) Pick the TFC that allows the transmission of the most high priority blocks.

It would be apparent to one skilled in the art that steps (1), (2), and (3) could be performed in any order and is within the scope of the present invention. Another embodiment comprises steps (2), (3), and (4), but not step (1). Each step is described in more detail below.

In step (1), TFCs are eliminated from the set of allowable TFCs based on power requirements. Each TFC requires a certain amount of power in order to be transmitted. The power requirement for each TFC is computed. The TFCs that require more power than can be currently transmitted are eliminated. The TFCs that do not require more power than can be currently transmitted remain.

In step (2), TFCs are eliminated based on the TTIs of the transport formats. The set remaining is a set of TFCs that can be used based on the constraint that transport formats cannot be changed in the middle of a TTI. Once a TF has been selected for a given transport channel, the TF cannot change until the next TTI boundary for that transport channel. Thus, it is only possible to select TFCs that have the same TF for that transport channel.

The pseudo-code for the elimination of TFCs based on TTI constraints of TFs in accordance with one embodiment is shown below. Vector notation is used for all the sets that are used. If A is a set of TFCs then A[i] is the ith TFC in the set. If B is a TFC then B[i] is the TF for the ith transport channel. If C is a TFS then C[i] is the ith TF in the set. If D is a TF, then D→RS and D→NB are Radio Link Control (RLC) block size and number of blocks for that TF, respectively. The RLC block size is a link layer block size.

If A is a physical channel then A→N is the number of transport channels mapped to this physical channel and A[i] is the ith transport channel mapped onto this physical channel. Also, if B is a transport channel then B[j] is the jth logical channel mapped onto this transport channel. Finally, if A is a physical channel then A[i][j] will denote the jth logical channel of the ith transport channel.

If B is a transport channel then B→TTI, B→TFS, and B→N are its TTI, its TFS, and the number of logical channels mapped to this transport channel, respectively. If L is a logical channel then L→BO is its Buffer Occupancy and L→RHL is the RLC header length for the corresponding RLC entity. P is a physical channel and N is the number of existing transport channels. Sets S and S2 are TFC sets.

Since the semi-static parameters cannot change from TTI to TTI, all the TFs in a TFS have to have the same values for such parameters. Hence, as far as the TFC selection algorithm is concerned, they become properties of the transport channel rather than of the TF.

$K_i$ is the index of the transport format used in the current time slot for the ith transport channel. The current time slot boundary is the boundary for TTIs with length TTI_max and lower. TTI_max is the maximum TTI boundary for a given time slot. S and S2 are TFC sets.
1. Set S2=S1.
2. Set i=1. This will be the index for all transport channels.
3. If P[i]→TTI<=TTI_max then go to step 12.
4. Set S=Ø.
5. Let m be the number of TFCs left in S2, indexed from 1 through M.
6. Set j=1. This will be the index for the elements in S2.
7. If P[i]→TFS[Ki]!=S2[j][i] then go to step 9.
8. Add S2[j] to S.
9. j=j+1.
10. If j<=M then go to step 7.
11. Set S2=S.
12. i=i+1.
13. If i<=P→N then go to step 3.
14. The algorithm is complete and the valid TFCs are in S2.

Figure 3:
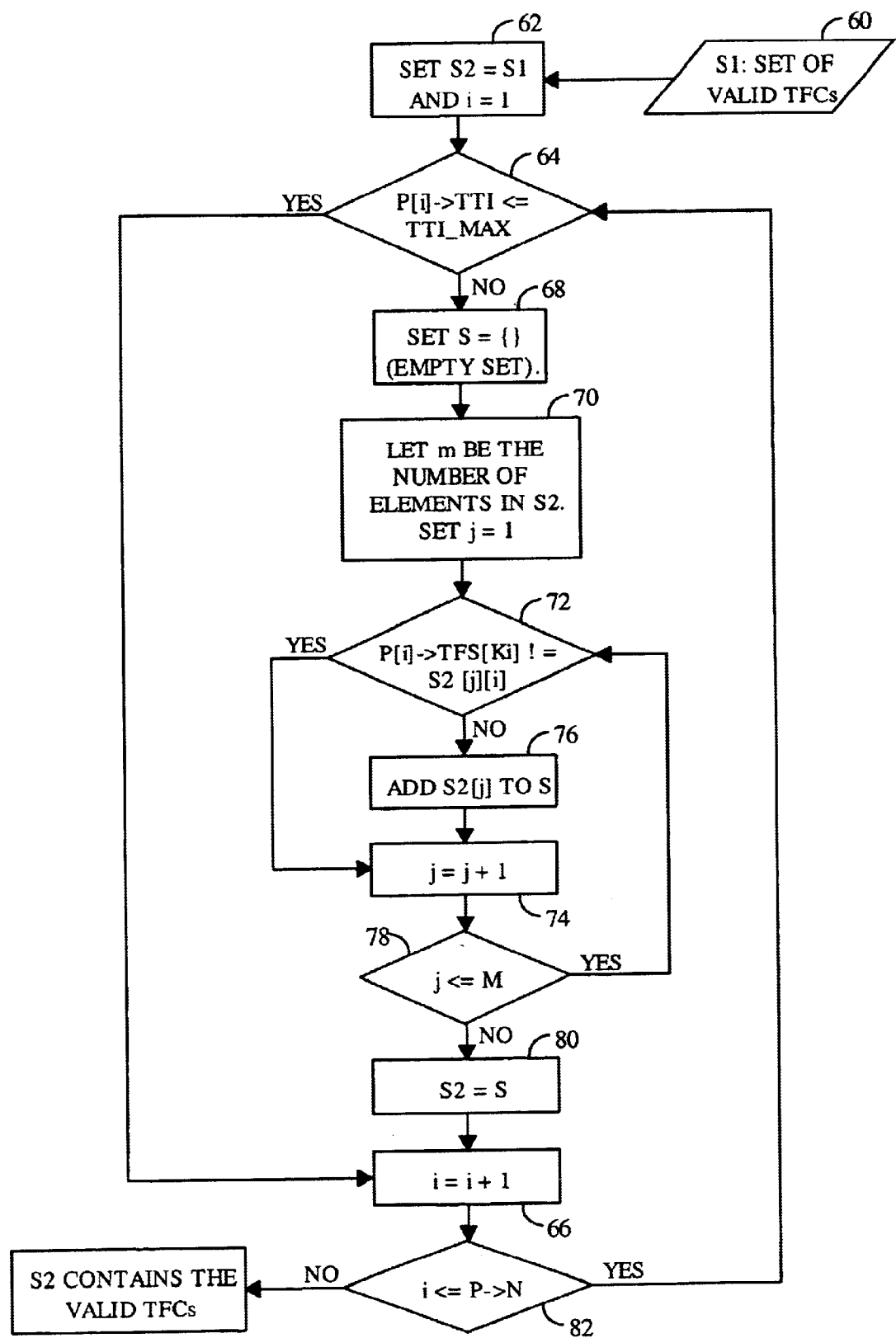
FIG. 3 shows a flowchart for the elimination of TFCs based on TTI constraints of transport frames in accordance with one embodiment.

FIG. 3 shows a flowchart for the elimination of TFCs based on TTI constraints of transport frames in accordance with one embodiment. In step 60, set S1 is the set of valid TFCs. S1 is the set of allowable TFCs that do not require more power than can be transmitted. In step 62, set S2 is set to S1 and index i is initialized. Index i is the index for all transport channels. Set S2 is a set of valid TFCs, wherein each TF for each transport channel will be compared to current TFs for each transport channel.

P is a physical channel. P[i] represents the ith transport channel mapped to the physical channel P. TTI_max is the maximum TTI length for a current TTI boundary. In step 64, the TTI of the ith transport channel is checked to determine whether it is less than or equal to TII_max. If the TTI of the ith transport channel is less than or equal to TTI_max, then the TF for the ith transport channel can be changed and in step 66, index i is incremented, i.e., go to the next transport channel. If the TTI of the ith transport channel is greater than TTI_max, then in step 68, set S to the empty set. Now, the TFCs in set S2 have to be checked to determine whether any of them has TFs for every transport channel that matches the current TFs for every transport channel. In step 70, m is the number of elements in S2 and index j is set to one. Index j is the index into set S2.

$K_i$, is the index of the transport format used in the current time slot for the ith transport channel. The current time slot boundary is the boundary for TTIs with length TTI_max and lower. In step 72, the current TF for transport channel i is checked to determine if it does not match the ith TF in the jth TFC in set S2. S2[j] denotes the jth TFC in set S2. S2[i][j] denotes the ith TF in the jth TFC in the set S2. The position of the TF in the TFC indicates the transport channel. If the current TF for transport channel i does not match the ith TF in the jth TFC in set S2, then in step 74, index j is incremented, i.e., go to the next TFC in set S2. If they do match, then in step 76, add the jth TFC to set S and in step 74, increment j.

Once index j is incremented, then in step 78, index j is checked to determine whether all of the TFCs in the set S2 have been checked. If not all of the TFCs in set S2 have been checked, then in step 72, the current TF for transport channel i is checked to determine if it does not match the ith TF in the jth TFC in set S2. If all of the TFCs in set S2 have been checked, then in step 80, set S2 is set to set S and in step 66, index i is incremented. In step 82, index i is checked to determine whether all of the TFCs have been checked for TTI constraints for all transport channels. If a TFC for a transport channel has not been checked, then in step 64, the TTI of the ith transport channel is checked to determine whether it is less than or equal to TTI_max. If all of the TFC for all of the transport channels have been checked, then set S2 contains the valid TFCs after elimination of TFCs based on TTI constraints.

The pseudo-code for the elimination of TFCs based on the current bit availability from the different logical channels given that introducing "padding" blocks is not allowed in accordance with one embodiment is shown below. A TFC is acceptable only if it does not contain more transport blocks than are available for any of the transport channels.
1. Set S3=S2.
2. Set i=1. This will be the index for all transport channels.
3. Let Sb be the set of RLC sizes that exist in any TFC in S3 for the $i^{th}$ transport channel.
4. Pick an RLC size RS from Sb.
5. Let St be the set of TFCs in S3 that have RLC size RS for the $i^{th}$ transport channel. Let M be the number of TFCs in St.
6. Set j=1. This will be the index for the TFCs in St.

7. Compute:

$$T = \sum_{k=1}^{P[i] \to N} \left\lceil \frac{P[i][k] \to BO}{RS - P[i][k] \to RHL} \right\rceil.$$

8. If St[j][i]→NB≦T then go to 10.
9. S3=S3−{St[j]}.
10. j=j+1.
11. If j≦M then go to step 8.
12. Set Sb=Sb−{RS}.
13. If Sb≠{ }then go to step 4.
14. Set i=i+1.
15. If i≦P→N then go to step 3.
16. If S3 is the empty set, or S3 is made up of the empty TFC (contains no data) and some data is available (exists some P[i][k]→BO≠0), then set S3=S2.
17. The algorithm is complete and the valid TFCs are in S3.

Figure 4:
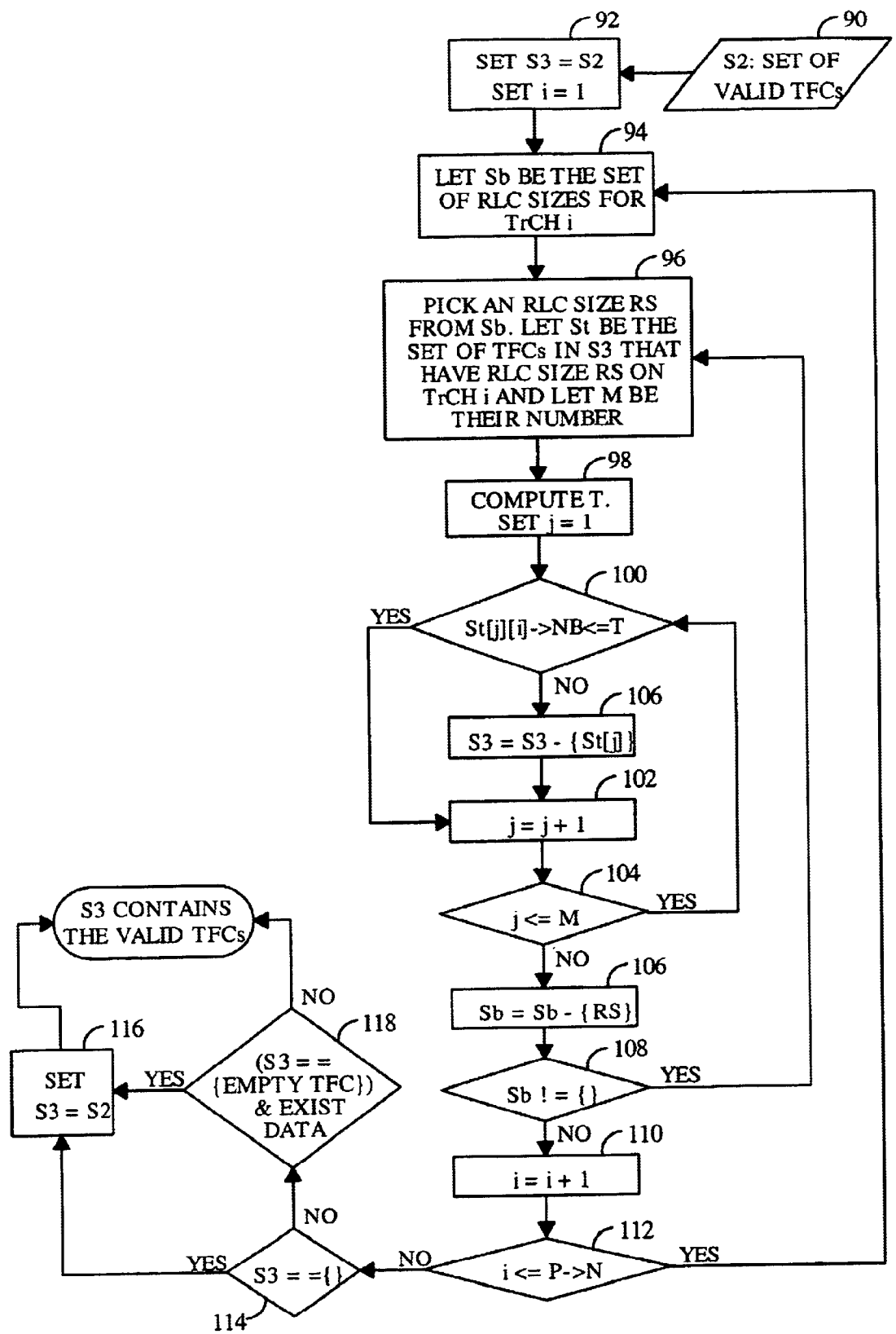
FIG. 4 shows a flowchart for the elimination of TFCs based on available blocks in accordance with one embodiment.

FIG. 4 shows a flowchart for the elimination of TFCs based on the current bit availability from the different logical channels given that introducing "padding" blocks is not allowed in accordance with one embodiment. In step 90, set S2 is the set of valid TFCs after elimination of TFCs based on TTI constraints. In step 92, set S3 is set to set S2 and index i is initialized. Index i is the index for the transport channels (TrCHi). In step 94, Sb is the set of RLC sizes for the ith transport channel. In step 96, an RLC size, RS, is selected from set Sb and St is the set of TFCs in set S3 that have RLC size RS on the ith transport channel. M is the number of TFCs in S3.

In step 98, a sum T is computed as $$T = \sum_{k=1}^{P[i] \to N} \left\lceil \frac{P[i][k] \to BO}{RS - P[i][k] \to RHL} \right\rceil,$$

wherein N is the number of logical channels, BO is a buffer occupancy of the kth logical channel of the ith transport channel in bits, RS is the RLC size in transport blocks, and RHL is the radio channel header length in transport blocks. The sum T only includes the logical channels that can use the RLC size specified by RS. Thus, the buffer occupancy of the kth logical channel of the ith transport channel that cannot use the RLC size specified by RS, is zero for the calculation of the sum T. Each summand of the summation is a ceiling. Thus, T is the ceiling of the buffer occupancy in bits of all logical channels that can use the RLC size, divided by the RLC size, which yields the number of transport blocks available from all transport channels of the RLC size. In Step 98, the index j for the number of TFCs is also initialized.

In step 100, the number of blocks in the ith TF in the jth TFC in the set St, i.e., the TF for the ith transport channel, is checked against the number of transport blocks available T. If the number of blocks in the ith TF is less than or equal to the number of transport blocks available T, then in step 102, index j is incremented and the flow of control goes to step 104. If the number of blocks in the ith TF is greater than the number of transport blocks available T, then in step 106, remove the jth TFC from the set S3 and the flow of control goes to step 102.

In step 104, check if all the TFCs in set St have been checked. If all of the TFCs have been checked, then the flow of control goes to step 106. If not all of the TFCs have been checked, then the flow of control goes to step 100 and the next TFC is checked.

In step 106, set Sb is set to set Sb−RS, i.e., the RLC size is removed from the set of RLC sizes. In step 108, set Sb is checked to determine if it is empty, i.e., that all RLC sizes have been checked. If set Sb is empty, then the flow of control goes to step 96 and another RLC size is selected. If Sb is not empty, then in step 110, index i is incremented for the next transport channel and in step 112, a check is made to determine if all of the transport channels have been checked. If not all of the transport channels have been checked, then the flow of control goes to step 96 and the next transport channel. If all of the transport channels have been checked, then in step 114, check if set S3 is empty. If set S3 is empty, then in step 116, set S3 to set S2. S3 now contains valid TFCs after elimination of TFCs based on the current bit availability from the different logical channels given that introducing "padding" blocks is not allowed. If set S3 is not empty, then in step 118, set S3 is checked to determine if set S3 is a set of an empty TFC (contains no data) and some data is available (exists some $P[i][k] \to BO \neq 0$), in which case the flow of control goes to step 116. In step 116, set S3 is set to set S2, in which case set S3 contains valid TFCs after elimination of TFCs based on the current bit availability from the different logical channels.

In one embodiment, all of the TFCs with the same block size (on the ith transport channel) are grouped in S3. In another embodiment, TFCs with the same block size do not have to be grouped together. In this embodiment, T is computed every time a different TFC is examined.

Even though padding is not allowed in most circumstances, there are some cases in which it is tolerated in order to avoid long delays in transmission and deadlock:
  If at the end of this algorithm, S3 is the empty set; and
  If the only TFC allowed is the empty TFC and some data is available.

The pseudo-code for the selection of the optimum TFC in accordance with one embodiment is shown below. Bits from the logical data streams are hypothetically loaded into the TFC. The loaded TFCs are compared based on the amount of high priority data they contain.

There are n priority levels, P1 through Pn with P1 being the highest priority. For each TFC in S3 a variable NOB (number of bits) is created and for each one of the transport channels on each TFC a variable SAB (still available blocks) is created. If A is a TFC, then A→NOB is the number of bits for this TFC and A[i]→SAB is the available space for the ith transport channel. The number of bits corresponds to a specific priority level. All SABs are initialized to the corresponding number of blocks. Then the following algorithm can be performed:

1. Set S4=S3.
2. Set i=1. This is going to be the index for the priority levels.
3. ∀j, set S4[j]→NOB=0.
4. Let Sc be the set of logical channels of priority Pi.
5. Select a logical channel L from Sc. Let this correspond to logical channel q, mapped onto transport channel j.
6. Let M be the number of TFCs in S4. Set k=1. This will be the index of TFCs in S4.
7. If S4[k][j]→RS and (S4[k][j]→SAB*S4[k][j]→RS) are allowed for logical channel P[j][q] go to step 9. This constraint can be specified either in the TFS (25.331.350 and latter) or through the "flex" primitives from RLC.
8. Go to step 14.

9. Compute $$G = \left\lceil \frac{P[j][q] \to BO}{S4[k][j] \to RS - P[j][q] \to RHL} \right\rceil.$$

10. If G<S4[k][j]→SAB then go to step 18.
11. S4[k]→NOB+=(S4[k][j]→SAB)·(S4[k][j]→RS) and S4[k][j]→SAB=0.
12. Go to step 14.
13. S4[k]→NOB+=G·S4[k][j]→RS and S4[k][j]→SAB-=G.
14. k=k+1.
15. If k≦M then go to step 7.
16. Sc=Sc-{L}.
17. If Sc≠{ } then go to step 5.
18. Keep in S4 the TFCs with the highest NOB value.
19. If there is a single TFC in S4 then the algorithm is complete and that TFC should be used.
20. i=i+1.
21. If i≦n then go to step 3.
22. Pick one of the TFCs in S4 that carries the lowest number of bits.

Figure 5A:
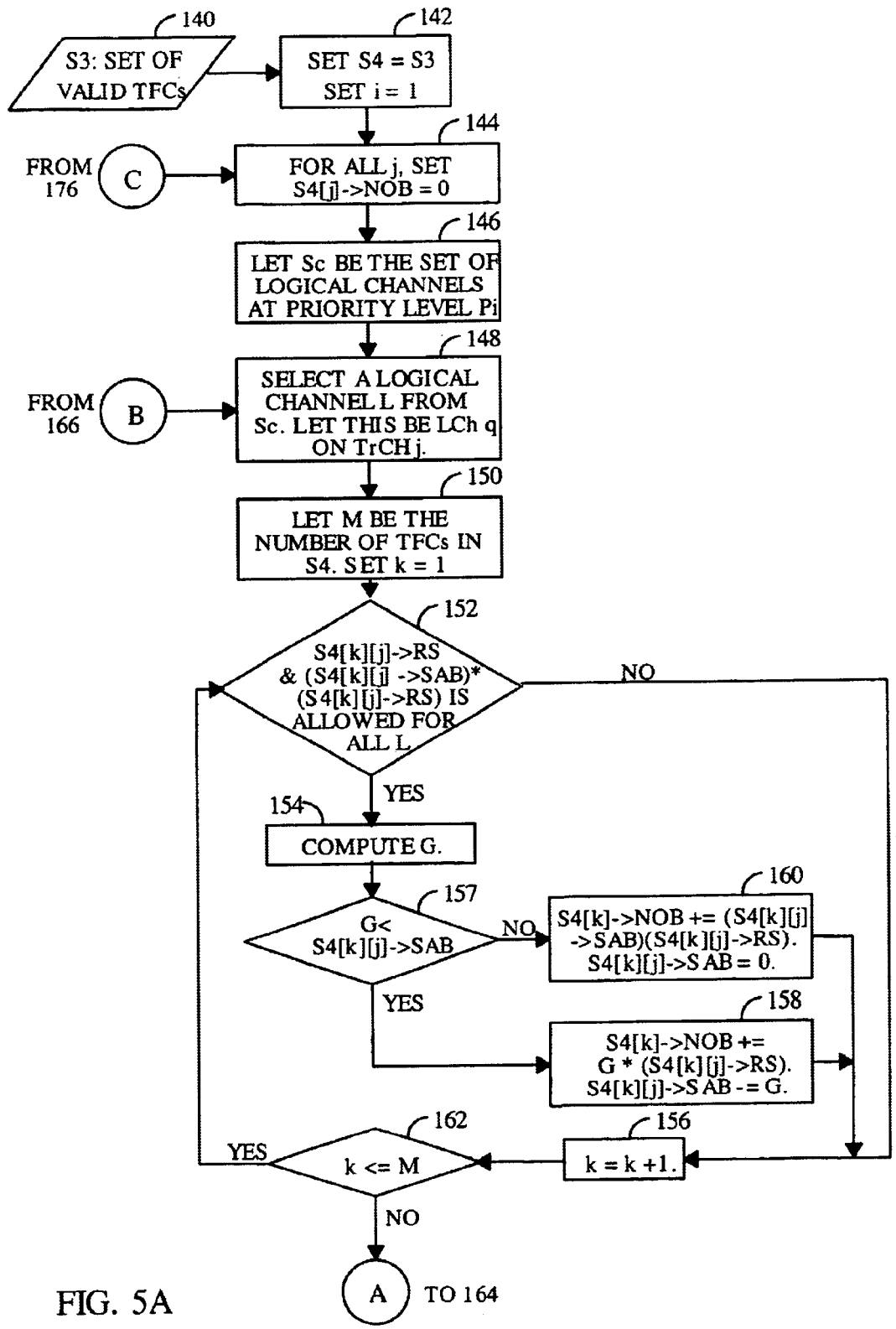
FIGS. 5a and 5b show flowcharts for selecting a TFC in accordance with one embodiment.
Figure 5B:
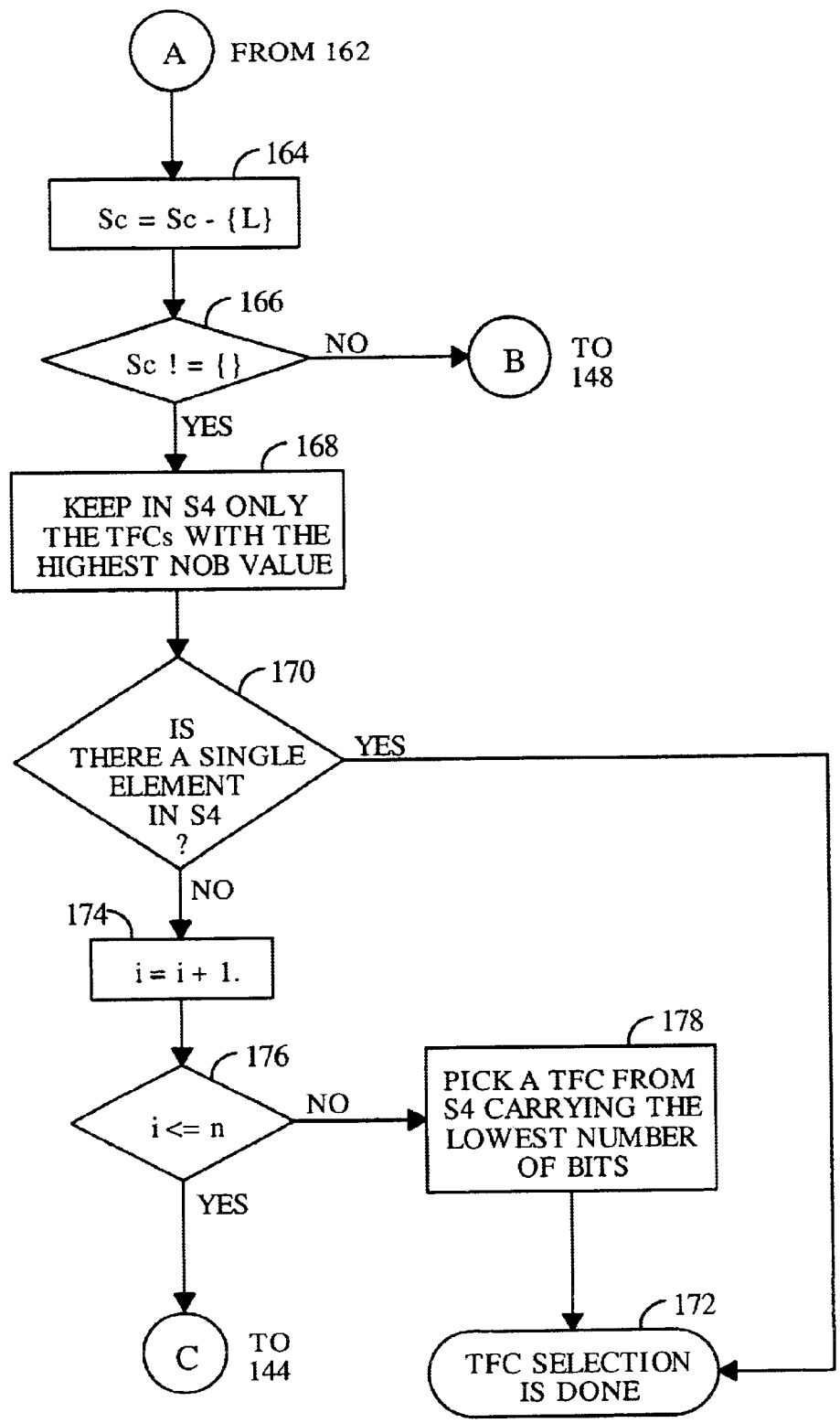

FIGS. 5a and 5b show flowcharts for selecting an optimum TFC in accordance with one embodiment. In step 140, S3 is a set of valid TFCs after elimination of TFCs based on available blocks. In step 142, S4 is set to set S3 and index i is initialized. Index i is the index for the priority levels. In step 144, all number of blocks NOBs for each TFC in set S4 are initialized to zero. In step 146, Sc is the set of logical channels at priority level $P_i$. In step 148, a logical channel L is selected from set Sc, such that L corresponds to a logical channel q mapped onto a transport channel j. In one embodiment, the logical channel L selected is indicated by the network. In step 150, M is the number of TFCs in S4 and k is initialized to one. k is the index of TFCs in set S4.

In step 152, if the RLC size of the jth TF in the kth TFC in set S4 is allowed and the quantity of the RLC size of the jth TF in the kth TFC in set S4 multiplied by still available blocks SAB in the jth TF in the kth TFC in set S4 is allowed, then in step 154, compute G. Otherwise, in step 156, increment index k, i.e., go to the next TFC in set S4. In one embodiment, the constraint of whether an RLC size or a quantity of the RLC size multiplied by available blocks in a TF, are allowed is indicated by the network. In another embodiment, this constraint is indicated in a TFS. In yet another embodiment, this constraint is indicated through a parameter from the Radio Link Control.

In step 154, G is computed as $$G = \left\lceil \frac{P[j][q] \to BO}{S4[k][j] \to RS - P[j][q] \to RHL} \right\rceil,$$

wherein P[j][q]→BO denotes the buffer occupancy in bits of the qth logical channel of the jth transport channel. S4[k][j]→RS denotes the RLC size in transport blocks of the jth TF in the kth TFC in the set S4. P[j][q]→RHL denotes the RLC header length in transport blocks of the qth logical channel of the jth transport channel. Thus, G is the number of available transport blocks for logical channel q that can be used to fill the jth TF in the kth TFC.

In step 157, if G is less than the still available blocks SAB of the jth TF in the kth TFC in set S4, then in step 158, the quantity of G multiplied by the block size of the jth TF in the kth TFC in set S4 is added to the number of blocks in the kth TFC of set S4. Also, in step 158, G is substracted from the still available blocks in the jth TF of the kth TFC in set S4. If G is greater than or equal to the still available blocks SAB of the jth TF in the kth TFC in set S4, then in step 160, the quantity of the still available blocks of the jth TF of the kth TFC in set S4 multiplied by the RLC block size of the jth TF of the kth TFC in set S4 is added to the number of blocks in kth TFC in S4. Also, in step 160, the still available blocks in the jth TF of the kth TFC in set S4 is set to zero. From both steps 158 and 160, k is incremented in step 156.

In step 162, a check is made to determine whether all of the TFCs in set S4 have been checked. If all of the TFCs in set S4 have not been checked, then the flow of control goes to step 152. If all of the TFCs in set S4 have been checked, then in step 164, logical channel L is removed from the set Sc and in step 166, set Sc is checked to determine if it is not empty. If Sc is not empty, then the flow of control goes to step 148. If Sc is empty, then in step 168, only the TFC with the highest NOB value is kept in set S4. In step 170, set S4 is checked to determine whether it has a single element. If set S4 has a single element in it, then in step 172, TFC selection finished. If there is not a single element in set S4, then in step 174, index i is incremented, i.e., go to the next priority level. In step 176, a check is made to determine whether all of the priority levels have been checked. If not all of the priority levels have been checked, then the flow of control goes to step 144. If all of the priority levels have been checked, then in step 178, a TFC with the lowest number of bits is selected and in step 172, TFC selection is finished and the optimum TFC has been selected.

As would be apparent to one of ordinary skill in the art, the TFC algorithm can be applied to other interconnections between network modules. It can be applied to any situation where a module has a plurality of inputs and produces a multiplexed output from the plurality of inputs. For example, a multiplexer module can be located within a BTS wherein the BTS multiplexes data streams from a plurality of subscriber units and produces a multiplexed data stream to be sent to the BSC.

Thus, a novel and improved method and apparatus for allocating data streams onto a single data stream given TTI constraints of transport formats. Those of skill in the art would understand that the various illustrative logical blocks, modules, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, and algorithm steps described in connection with the embodiments disclosed herein may be implemented or performed with a processor executing a set of firmware instructions, an application specific integrated circuit (ASIC), a field programmable gate array (FPGA) or other programmable logic device, discrete gate or transistor logic, discrete hardware components such as, e.g., registers, any conventional programmable software module and a processor, or any combination thereof designed to perform the functions described herein. The multiplexer may advantageously be a microprocessor, but in the alternative, the multiplexer may be any conventional processor, controller, microcontroller, or state machine. The applications could reside in RAM memory, flash memory, ROM memory, EPROM memory, EEPROM memory, registers, hard disk, a removable disk, a CD-ROM, or any other form of storage medium known in the art. As illustrated in FIG. 2, a base station 14 is advantageously coupled to a subscriber unit 12 so as to read information from the base station 14. A memory 49 may be integral to the multiplexer 48. The multiplexer 48 and memory 49 may reside in an ASIC (not shown). The ASIC may reside in a telephone 12.

The previous description of the embodiments of the invention is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for multiplexing a plurality of data streams onto one data stream, comprising:
   receiving a set of transport format combinations; and
   selecting a transport format combination (TFC) from the received set of transport format combinations based on whether transport formats (TFs) in the selected transport format combination have a transmission time interval that is on a current transmission time interval boundary and based on whether the transport formats in the selected transport format combination matches their corresponding current transport formats in a last transport format combination that was transmitted over the one data stream.

2. The method of claim 1, wherein selecting the TFC is also based on every TF in the selected TFC not containing more data blocks than are available for a corresponding transport channel.

3. The method of claim 2, wherein selecting the TFC is also based on the priority of a plurality of data streams.

4. The method of claim 3, wherein selecting the TFC is also based on the selected TFC having more bits from higher priority data streams than from lower priority data streams.

5. A method for multiplexing a plurality of data streams onto one data stream, comprising:
   receiving a set of transport format combinations; and
   eliminating from the received set of transport format combinations, transport format combinations (TFCs) that have transport formats (TFs) that do not have transmission time intervals that are on a current transmission time interval boundary and do not match their corresponding current transport formats in a last transport format combination, in order to generate a modified set of transport format combinations.

6. The method of claim 5, further comprising eliminating from the modified set of transport format combinations, transport format combinations that have transport formats containing more data blocks than are available for a corresponding transport channel.

7. The method of claim 6, further comprising selecting a TFC from the modified set of transport format combinations based on the priority of a plurality of data streams.

8. The method of claim 7, wherein selecting the TFC from the modified set of transport format combinations is based on the TFC having more bits from higher priority data streams than other TFCs in the modified set of transport frame combinations.

9. The method of claim 8, further comprising filling the selected TFC with bits from the plurality of data streams.

10. The method of claim 9, further comprising scheduling the selected TFC for transmission.

11. A subscriber unit, comprising:
   a memory;
   a plurality of applications configured to reside in the memory, each application capable of producing a data stream, wherein each data stream comprises at least one bit; and
   a multiplexer configured to receive each data stream, receive a set of TFCs, and select a TFC from the received set of TFCs based on whether transport formats (TFs) in the selected TFC has a transmission time interval that is on a current transmission time interval boundary and based on whether the transport formats in the selected transport format combination matches their corresponding current transport formats in a last transport format combination that was transmitted over the one data stream.

12. The subscriber unit of claim 11, wherein the multiplexer is configured to select the TFC based on the priority of data streams.

13. The subscriber unit of claim 12, wherein the multiplexer is configured to fill the selected TFC with bits from the plurality of data streams.

14. The subscriber unit of claim 13, wherein the multiplexer is configured to schedule the selected TFC for transmission.

15. The subscriber unit of claim 13, wherein the multiplexer is configured to allocate the TFC to a single transport stream.

16. The subscriber unit of claim 12, wherein the multiplexer is configured to select the TFC that includes more bits from the highest priority data stream of the plurality of data streams than other TFC in the set of TFCs.

17. A base station, comprising:
   a memory;
   a plurality of applications residing in the memory, each application capable of producing a data stream, wherein each data stream comprises at least one bit; and
   a multiplexer configured to receive each data stream, receive a set of TFCs, and select a TFC from the received set based on whether transport formats (TFs) in the selected TFC has a transmission time interval that is on a current transmission time interval boundary and based on whether the transport formats in the selected transport format combination matches their corresponding current transport formats in a last transport format combination that was transmitted over the one data stream.

18. The base station of claim 17, wherein the multiplexer is configured to fill the selected TFC with bits from the plurality of data streams based on the priorities of the plurality of data streams.

19. A base station controller, comprising:
   a memory;
   a plurality of applications residing in the memory, each application capable of producing a data stream, wherein each data stream comprises at least one bit; and
   a multiplexer configured to receive each data stream, receive a set of TFCs, and select a TFC from the received set based on whether transport formats (TFs) in the selected TFC has a transmission time interval that is on a current transmission time interval boundary and based on whether the transport formats in the selected transport format combination matches their corresponding current transport formats in a last transport format combination that was transmitted over the one data stream.

20. The base station controller of claim 19, wherein the multiplexer is configured to fill the selected TFC with bits from the plurality of data streams based on the priorities of the plurality of data streams.

* * * * *